NONACOUSTIC MEASURES IN AUTOMATIC SPEECH RECOGNITION

Filed May 28, 1964 4 Sheets-Sheet 1

INVENTORS
WILLIAM A. HILLIX
DAVID C. MILNE
MICHAEL N. FRY

3,383,466
NONACOUSTIC MEASURES IN AUTOMATIC SPEECH RECOGNITION

William A. Hillix, San Diego, David C. Milne, Stanford, and Michael N. Fry, San Diego, Calif., assignors to the United States of America as represented by the Secretary of the Navy Filed May 28, 1964, Ser. No. 371,153
3 Claims. (Cl. 179—1)

ABSTRACT OF THE DISCLOSURE

In a speech analyzer, lip and face movements, air velocities, and acoustical sounds are sensed and compared, the information being digitally stored and processed.

The invention described herein may be manufactured and used by or for the Government of the United States of America for governmental purposes without the payment of any royalties thereon or therefor.

This invention relates to speech recognition devices and is particularly directed to means for converting speech information to narrow band electric signals.

Heretofore, attempts have been made in the "vocoder" to narrow the frequency spectrum of speech for purposes of transmission and/or recording by dividing, by filters, the spectrum into a number of contiguous narrow bands and then integrating and quantizing each band. Such a system can reduce normal speech to a few hundred bits of binary information per second. Unfortunately, the system is unduly complex and difficult to operate. Further, such a system does not reduce the information of speech to the bare minimum required for information transmission and is not acceptable, as desired, to computers or digital equipment.

The object of this invention is to provide means for recognizing and converting the information of speech to coded binary information which can be recorded, as on punched tape, or fed directly into digital computer-type equipment.

The object of this invention is attained by a non-acoustic speech recognition system comprising one or more transducers juxtaposed with one or more elements of the vocal anatomical apparatus of the speaker, the transducers being sensitive to quantize the physiological involvement of the speech-making elements. It has been found that the waveform at the output of the transducers is characteristic of each speech event and is similar for different speakers and background conditions. The rate of frequency of movement of the lips, the tongue, the air masses in the nostrils or between the lips, and the movement of the vocal cords is but a small fraction of the frequencies normally associated with intelligible speech. It has been found, for example, that the movement of the lower lip is sufficiently distinctive to produce a waveform which can be reliably identified with the numbers of our decimal numbering system. Reliability of recognition can be increased by correlating lip movement with air velocity between the lips or in the nostrils or with amplitude of vibration of throat tissues adjacent to the larynx. Conveniently, the voltage of the slow moving waveforms of each transducer can be sampled at relatively close intervals and the sample voltage converted to binary coded digital information which can be recorded on tape or stored electrically in computer memories for future use.

Other objects and features of this invention will become apparent to those skilled in the art by referring to the specific embodiments described in the following specification and shown in the accompanying drawing in which.

Figure 1:
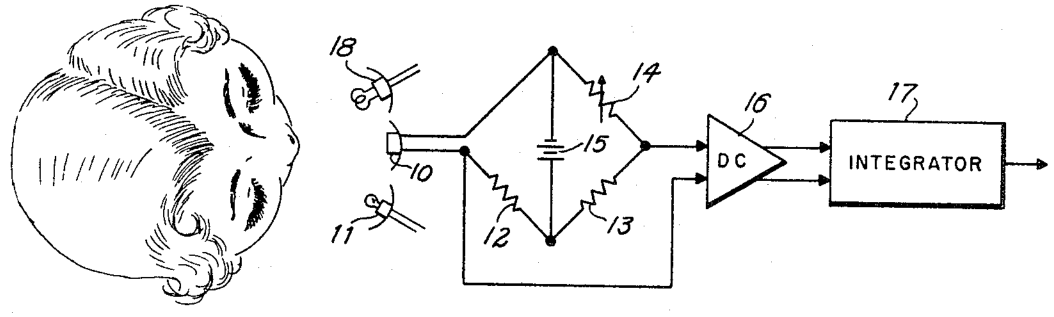
FIG. 1 is a schematic diagram of a speech recognition device according to this invention.

Lip movement may be conveniently measured by either reflected or transmitted light. In FIG. 1 the photo-cell 10 is located on one side of the mouth and receives transmitted light from a light source 11 when the lips are opened. The photocell could be inside the mouth to receive light from the outside when the lips are opened. Also, the photocell and light source could be mounted in front of the lips as in FIG. 1, so as to detect forward motion of the lips, as during "pursing." The photocell and light source are preferably attached to a headpiece, with adjustments for different operators, but the transducers could also be hand-held.

Figure 2:
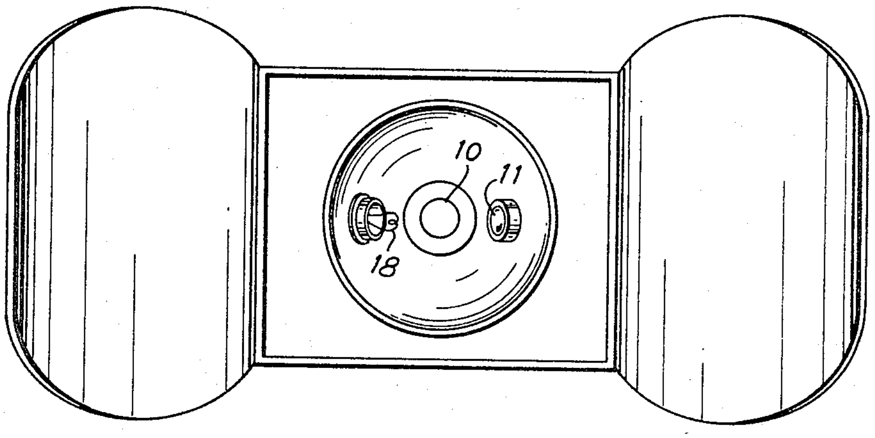
FIG. 2 is an elevational view of one apparatus contemplated in FIG. 1.
Figure 3:
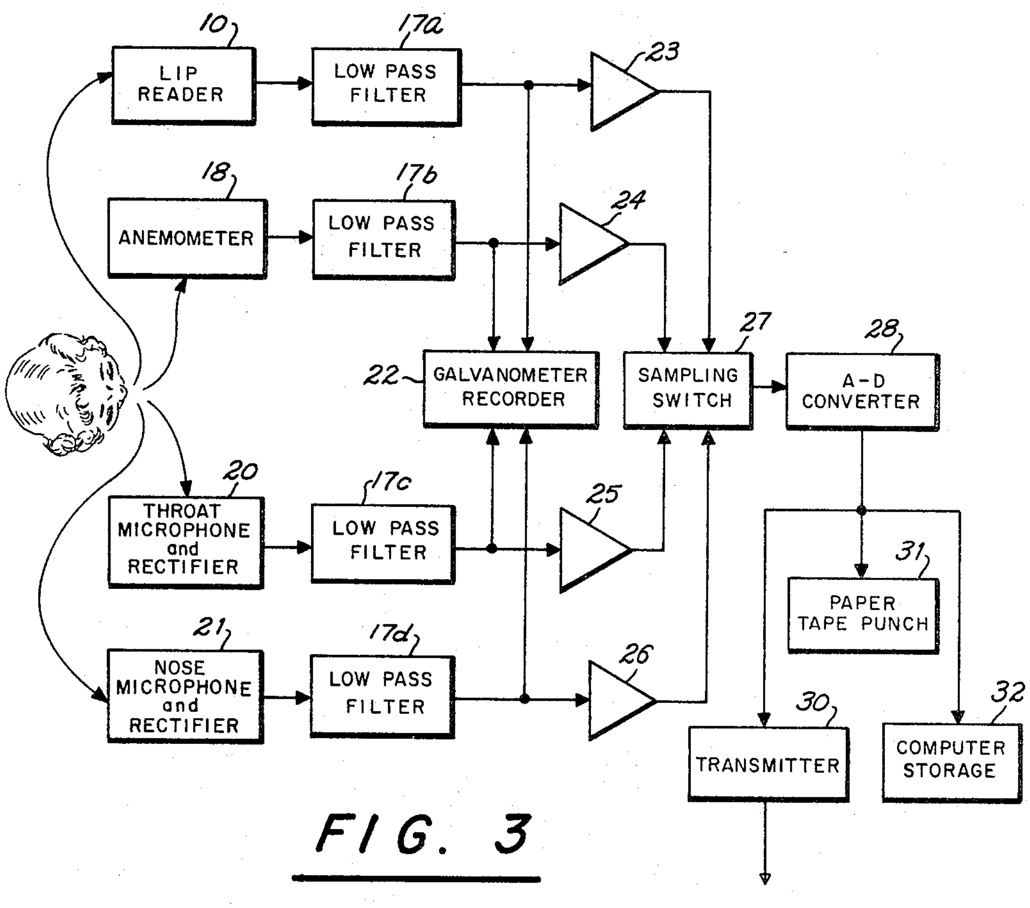
FIG. 3 is a block diagram of the system employing several transducers and readout mechanisms.
Figure 4:
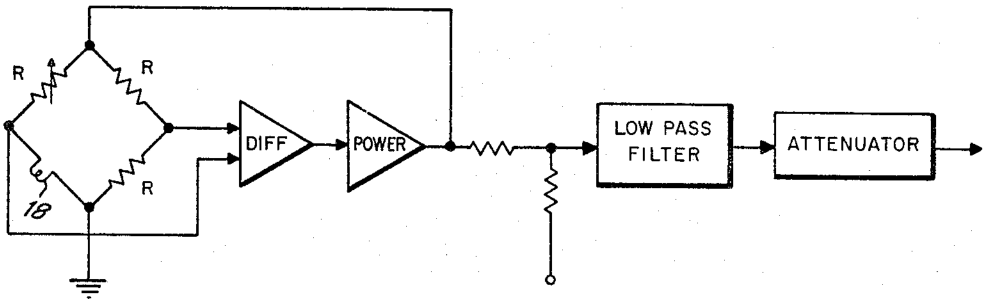
FIG. 4 shows the circuits of an anemometer read-out.

In FIG. 1 the variable resistance of the photocell is placed in one branch of a bridge circuit comprising resistances 12, 13 and 14. Across one diagonal of the bridge is the voltage source 15. The output of the bridge across the other diagonal is connected into the input of the direct current amplifier 16. For any given quantity of light in the reset position of the lips, the input of the DC amplifier may be normalized by the variable resistance 14 in one branch of the bridge. Preferably the low-pass filter 17, is connected in the output of the amplifier to eliminate all voltage fluctuations except the gross movements produced by the lips.

Where air velocity between the lips is to be measured, anemometer 18 is conveniently located directly in front of the lips with a "funnel" to collect the flow of air. FIG. 2 shows the anemometer 18 mounted adjacent the photocell 10 and the light source 11. The particular device for measuring air velocity shown here comprises a tungsten filament of a flashlight bulb with the envelope removed. This is positioned in a socket beside the photocell socket. The resistance of the filament when heated to 200°–300° C. is sensitive to the cooling effects of minute air currents and may be connected, as shown in FIG. 4, in a constant temperature bridge similar to the photocell bridge, but with feedback to keep resistance constant. Minute air currents will cool the filament, and lower its resistance. The change in resistance causes a voltage output from the Wheatstone bridge, which is amplified and returned to the bridge. The added voltage heats the hot-wire and corrects the temperature. The voltage output is the increase in voltage necessary to maintain the temperature of the hot-wire with respect to that voltage necessary in still air. The hot wire is very sensitive, so that the output must be filtered to remove high frequencies caused by turbulence and the audio component of the onrushing air.

The amplitude of the vibrations of the larynx may be conveniently measured by a throat microphone strapped or held next to the neck adjacent to the larynx. The audio signal from the throat microphone is amplified, rectified, and filtered to give the short term average amplitude of the vibrations of the larynx.

Nasal sounds may be conveniently detected by means of a microphone coupled to the nasal cavity. A small ceramic microphone is coupled to the nasal cavity or a small plastic tube which extends about ⅜" into one nostril. The audio signal from the microphone is amplified, rectified, and filtered, to give the short-term average amplitude of the airborne sound in the nasal cavity.

The low-pass filters 17*a*, 17*b*, 17*c* and 17*d* are, respctively, connected in the output circuits of the four transducers 10, 18, 20 and 21, for the purpose of separating noise, transients, and the audio component from the physiological movement being measured. The filters currently used pass DC to 10 cycles/sec., and have a slope of 18 db/octave. The waveforms produced by the several transducers may be separately recorded by the galvanometer recorder 22.

Additionally, the waveform signals of the several transducers may be amplified in amplifiers 23, 24, 25 and 26. The four waveform voltages are rapidly sampled in succession by the sampling switch 27 and each sample is converted to digital information by any of the many available analog-to-digital converters, 28. The binary coded signal for each sample may then be applied to the tape or tape punch 31 or, alternatively, to the computer storage 32. Alternatively, the signals may be modulated on a carrier in the transmitter 30 for transmission to a remote receiver.

Each speech event involved in the enunciaiton of one of the ten decimal numbers requires normally about 500 milliseconds. If the switching rate of the sampling switch is, say, 60 samples per second, each of four transducer signals will be sampled at the rate of about 15 samples per second, and each measure for each such speech event is sampled about 7 or 8 times. The sampling speed, of course, can be adjusted to suit the bandwidth and resolution of the equipment to be used.

Figure 5:
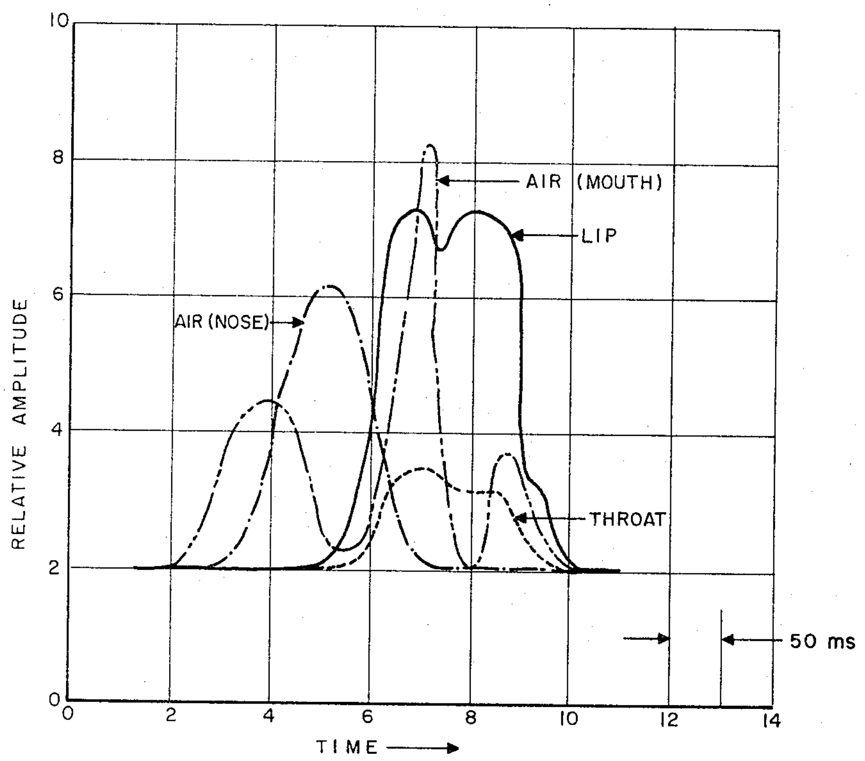
FIG. 5 is a diagram of the waveforms of the four transducers of FIG. 3.

FIG. 5 shows the four waveforms obtained from a speaker speaking at normal rate and enunciating the word "seven." In this case the beginning of the acoustic event was arbitrarily taken when the lip displacement voltage exceeded the rest voltage by two units of output voltages. The gain in each transducer amplifier is easily adjusted to provide commensurate scales on the one graph.

Figure 6:
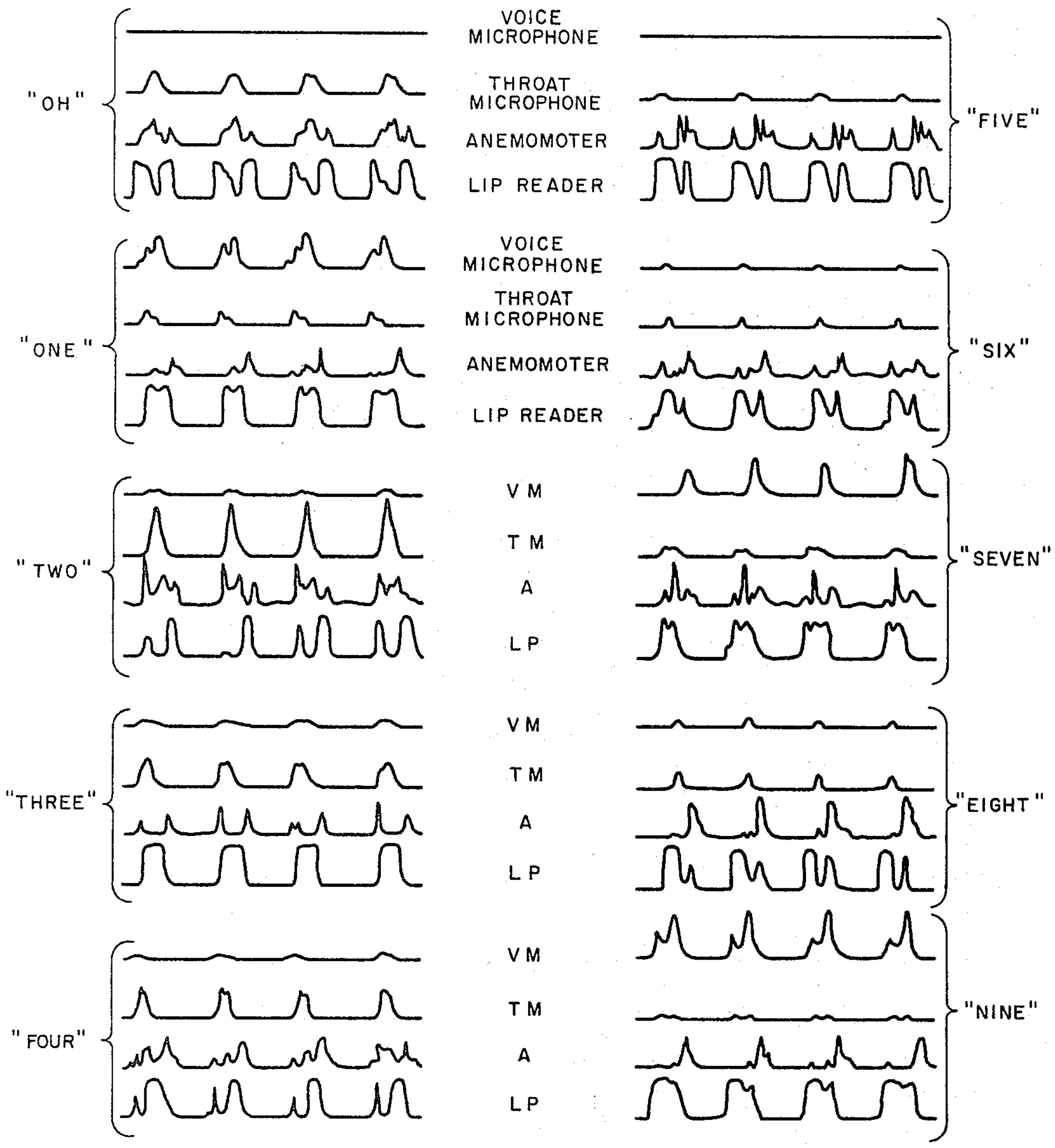
FIG. 6 is a set of typical waveforms for the four transducers for each of the ten decimal numbers.

In FIG. 6 is shown the recorded transducer waveforms for the acoustical event in connection with the utterance of each of the ten decimal numbers. The four transducers were, respectively, the lip-reader 10, the anemometer wire 18, the throat microphone 20 and the nose microphone 21. Repettition of the utterances by one speaker produced only small variations in the waveforms representing the same utterance. As expected, variations in the specific details of the waveforms varied from speaker to speaker. It is contemplated that in operation a catalogue of all wave forms of all speech events be stored, as in the magnetic memory of a general purpose digital computer, so that thereafter unknown waveforms may be compared or matched with the catalogue. The unknown waveform may then be identified and properly reported out to operate, say a teletypewriter. To obviate uncertainties caused by differences in waveforms of different speakers, the one person intended for operating the speech recognition system should be employed to "teach" the equipment, during the catalogue-making period. Further, it is preferred that the "teaching" operation include the repetition several times of each letter or event so as to establish upper and lower threshold values for each test voltage so that during the recognition period, the waveforms more certainly fall within acceptable limits. Still further, to obviate hour-to-hour or day-to-day changes in one's own speech characteristics, it is preferred that the teaching operation immediately precede message reading and transmission.

It is apparent that the waveforms recorded by the equipment of this invention can be employed as a useful tool in speech therapy.

Many modifications may be made in the transducer arrangement of this invention. A transducer, for example, may be added for measuring the movement of the tongue during speech events. Such a transducer could comprise a thin flexible conductor placed on the roof of the mouth of the operator to measure capacity changes caused by movement of the tongue.

It is clear that since the vocal apparatus of a speaker moves at low speeds, or frequencies, which are very low compared to voice frequencies, signals of narrow bandwidths are adequate in the transmission of information obtained by the nonacoustical speech transducers of this invention.

Figure 7:
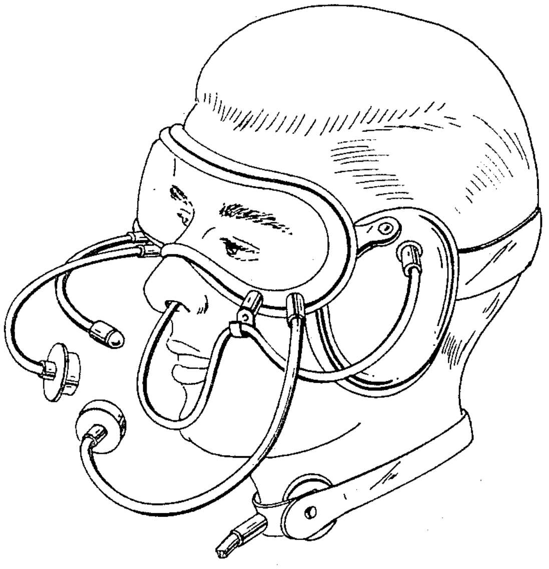
FIG. 7 shows the mechanical assembly of several transducers.

FIG. 7 shows the front view of a laboratory prototype which has been employed in work of this invention. Goggles were employed as a supporting structure for several of the transducers. Strips or wires of hardened lead which could be formed and set by hand provided adjustable support for the light source, the anemometer, the photocell and the nose microphone.

Many modifications may be made in the system of this invention without departing from the scope of the invention as defined in the appended claims.

What is claimed is:

1. A nonacoustic speech recognition system comprising, a plurality of transducers so juxtaposed, respectively, with a plurality of different elements of the vocal anatomical apparatus of the speaker as to respond to gross physiological involvements of said elements during a speech event and to generate voltage waves representative of said gross physiological involvements, a separate low-pass filter connected to the output of each of said transducers to pass said voltage waves and to suppress audible voice frequencies, an analog-to-digital converter coupled to the output of each low pass filter for converting each of said voltage waves to digital information, and means for combining the digital information corresponding to said voltage waves to identify said speech event producing the voltage waves.

2. The speech recognition system defined in claim 1 further comprising, means for sampling the amplitude of each waveform at discrete intervals of time, and means for converting the analog value of each sample to a binary coded number.

3. The speech recognition system defined in claim 1 further comprising, means for sampling the amplitude of each waveform at regular intervals of time, means for converting the analog value of each sample to a binary coded number, and means for storing each of the coded numbers of each waveform for uniquely defining each speech event with a set of coded numbers.

References Cited

UNITED STATES PATENTS

| | | | |
|---|---|---|---|
| 3,167,710 | 1/1965 | Cox | 324—77 |
| 3,192,321 | 6/1965 | Nassimbene | 179—1 |

KATHLEEN H. CLAFFY, *Primary Examiner.*

R. MURRAY, R. P. TAYLOR, *Assistant Examiners.*